US012731136B2

(12) United States Patent
Vines et al.

(10) Patent No.: US 12,731,136 B2
(45) **Date of Patent: *Sep. 8, 2026**

(54) ENABLING CONFIDENTIAL AND NON-CONFIDENTIAL TRANSACTIONS ON A DIGITAL TOKEN ARCHITECTURE

(71) Applicant: Solana Labs, Inc., San Francisco, CA (US)

(72) Inventors: Michael Janacek Vines, La Jolla, CA (US); Sam Bit Kim, New York, NY (US)

(73) Assignee: Solana Labs, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/957,917

(22) Filed: Nov. 25, 2024

(65) Prior Publication Data

US 2025/0094969 A1 Mar. 20, 2025

Related U.S. Application Data

(63) Continuation of application No. 18/078,660, filed on Dec. 9, 2022, now Pat. No. 12,190,317.

(Continued)

(51) Int. Cl.

| | |
|---|---|
| ***G06Q 20/38*** | (2012.01) |
| ***G06F 21/60*** | (2013.01) |
| ***H04L 9/32*** | (2006.01) |
| *G06Q 20/02* | (2012.01) |
| *G06Q 20/06* | (2012.01) |
| *G06Q 20/10* | (2012.01) |
| *G06Q 20/40* | (2012.01) |

(52) U.S. Cl.

CPC ....... *G06Q 20/3829* (2013.01); *G06F 21/604* (2013.01); *H04L 9/3218* (2013.01)

(58) Field of Classification Search

CPC .. G06Q 20/3829; G06Q 20/065; G06Q 20/10; G06Q 20/3825; G06Q 20/389; G06Q 20/401; G06Q 20/02; G06Q 2220/00; H04L 9/3218; G06F 21/604

USPC .......................................................... 705/71

See application file for complete search history.

(56) References Cited

U.S. PATENT DOCUMENTS

2019/0034923 A1* 1/2019 Greco .................. G06Q 20/383
2019/0164153 A1* 5/2019 Agrawal .............. G06Q 20/065

(Continued)

FOREIGN PATENT DOCUMENTS

WO WO-2021009496 A1 * 1/2021 ............... H04L 9/50

OTHER PUBLICATIONS

Lim, "Solana's Token Program, Explained", retrieved from https://pencilflip.medium.com/solanas-token-program-explained-de0ddce29714, Oct. 29, 2021, 24 pages (Year: 2021).*

(Continued)

*Primary Examiner* — James D Nigh

(74) *Attorney, Agent, or Firm* — ASHURST PERKINS COIE US LLP; Andrew T. Pettit; Katlyn Stockslager

(57) ABSTRACT

Introduced here is a new program that was developed to provide privacy for data stored on a blockchain. This new program was designed to be deployed on the blockchain as an extension to the existing program that allows non-confidential transfers of funds. This new can work in conjunction with the existing program to permit users to conduct confidential and non-confidential transactions as necessary based on the sensitivity of the data involved.

20 Claims, 4 Drawing Sheets

Related U.S. Application Data

(60) Provisional application No. 63/288,073, filed on Dec. 10, 2021.

(56) References Cited

U.S. PATENT DOCUMENTS

| | | | | |
|---|---|---|---|---|
| 2019/0303887 | A1 | 10/2019 | Wright et al. | |
| 2020/0126075 | A1 * | 4/2020 | Fisch | G06F 21/6245 |
| 2021/0327191 | A1 | 10/2021 | Ivanov et al. | |
| 2023/0128945 | A1 * | 4/2023 | Khan | G06Q 30/0239 705/14.39 |

OTHER PUBLICATIONS

Friel "Understanding Program Derived Addresses", Oct. 21, 2021, 9 pages (Year: 2021).*

International Search Report and Written Opinion of International Application No. PCT/US2022/052363; Date of Mailing: Jun. 6, 2023; 13 pages.

Vazquez, "ZeroCT: Improving Zerocoin with Confidential Transactions and more." In: Cryptology ePrint Archive, Jan. 17, 2019, retrieved May 9, 2023 from https://eprint.iacr.org/2019/072.

"Lim, "Solana's Token Program, Explained: Breaking down how fungible and non-fungible tokens work in Solana."", In: pencilfip.medium.com, Oct. 29, 2021, (online) retrieved on May 9, 2023 from https://pencilflip.medium.com/solanas-token-program-explained-de0ddce29714.

* cited by examiner

ENABLING CONFIDENTIAL AND NON-CONFIDENTIAL TRANSACTIONS ON A DIGITAL TOKEN ARCHITECTURE

CROSS-REFERENCE TO RELATED APPLICATIONS

This application is a continuation of U.S. patent application Ser. No. 18/078,660, titled "Enabling Confidential and Non-Confidential Transactions on a Digital Token Architecture" and filed on Dec. 9, 2022, which claims the benefit of U.S. Provisional Application No. 63/288,073, titled "Enabling Confidential and Non-Confidential Transactions on a Digital Token Architecture" and filed on Dec. 10, 2021, the aforementioned applications are incorporated herein by reference in their entirety.

TECHNICAL FIELD

Various embodiments concern computer programs and associated computer-implemented techniques for permitting confidential and non-confidential transactions on a blockchain, as well as processing confidential transactions.

BACKGROUND

The term "blockchain" generally refers to a growing list of digital records—referred to as "blocks"—that are linked together using cryptography. Generally, each block is representative of a data structure that includes a cryptographic hash of the previous block, a timestamp, and transaction data (or simply "data"). The timestamp proves that the data existed when the block was published in order to get into its cryptographic hash. Since each block includes information about the preceding block, these blocks form a "chain," with each new block reinforcing the ones before it.

Blockchains have gained a considerable amount of traction over the last few years, transforming the way that society reasons about trust in computation. At a high level, the manner in which blockchains are formed makes them resistant to modification because once recorded, the data in any given block are essentially immutable unless all subsequent blocks are altered. As technologies that rely on, or make use of, blockchains are more widely adopted, those blockchains are beginning to store an increasing amount of sensitive data. Examples of sensitive data include financial information such as payment card information and bank account information, healthcare information such as medical records and insurance account information, and personal information such as social security number and credentials.

Many blockchains today are specifically designed to process and maintain financial data. As an example, the Solana Program Library is a collection of programs that can be deployed "on chain." One of these programs—namely, the SPL Token Program (or simply "Token Program")—allows users to maintain financial data on the blockchain. Users can, for example, use the Token Program to create a new set of digital tokens (or simply "tokens") for their specific applications. Moreover, users may be able to use the Token Program to send tokens to, and receive tokens from, other users.

Figure 1:
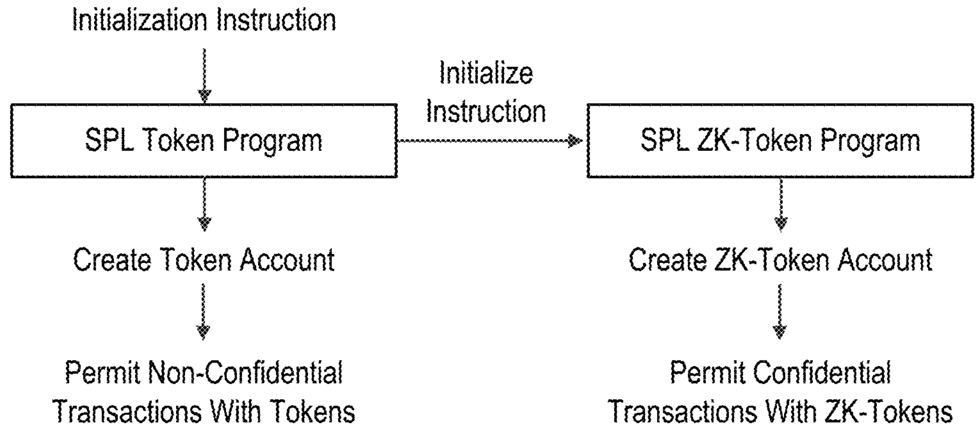
FIG. 1 includes a high-level diagrammatic illustration that shows how a token account can be created for the Token Program using an initialization instruction, as well as how a corresponding ZK-token account can be created as further discussed below.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

One limitation of the Token Program is that the financial data maintained on the blockchain is publicly available to all users. Thus, any user could look up an account for which information is stored on the blockchain, for example, in order to see how many tokens the account holds. This "full" visibility has historically been helpful as a mechanism for building trust in the capabilities of blockchains. However, full visibility is not always necessary for blockchains in which sufficient levels of trust have been gained. Moreover, full visibility can be harmful if the data stored on the blockchain is sensitive.

Introduced here, therefore, is a new program that was developed to provide privacy for data stored on a blockchain. This new program—called the SPL ZK-Token Program (or simply "ZK-Token Program")—was designed to be deployed on the blockchain managed by Solana Labs, Inc. as an extension to the Token Program. As further discussed below, the ZK-Token Program can work in conjunction with the Token Program to permit users to conduct confidential and non-confidential transactions as necessary based on the sensitivity of the data involved.

With the ZK-Token Program, the balance of each account can be maintained in encrypted form such that no outside party can view how many tokens are held. Furthermore, the ZK-Token Program can guarantee confidentiality in transactions involving the transfer of tokens as further discussed below. If a user utilizes the ZK-Token Program to transfer a certain number of tokens to another user, then it can be guaranteed that the number of tokens included in the transfer is hidden from outside parties. The term "outside party" may refer to any entity (e.g., person or program) that is not considered part of a transaction.

Further technical information regarding the ZK-Token Program is set forth below. For the purpose of illustration, the main cryptographic components that are used in the ZK-Token Program are (i) an encryption scheme that is used to encrypt account balances and transfer amounts and (ii) zero-knowledge proofs that are used to certify that the encrypted values produced in accordance with the encryption scheme have a certain form. While embodiments may be described in the context of certain encryption schemes (e.g., ElGamal) and zero-knowledge proofs (e.g., net-zero proofs, equality proofs, and range proofs) those skilled in the art will recognize that the approach is amenable to modification.

Moreover, embodiments may be described in the context of executable instructions for the purpose of illustration. However, those skilled in the art will recognize that aspects of the technology described herein could be implemented via hardware, firmware, or software. As an example, the Token Program and ZK-Token Program could be designed so as to be executable by graphics processing units (GPUs), or the Token Program and ZK-Token Program could be implemented, at least partially, in firmware or hardware.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The term "confidentiality" refers to the privacy of the amount of tokens associated with a transaction. As an example, assume that Alice initiates a confidential transfer of ten tokens from her account to another account associated with Bob. Such a transfer may reveal that some form of transfer did take place between Alice and Bob, but it will not reveal that ten tokens were transferred between these parties if the transfer is "confidential."

The term "anonymity" refers to the privacy of the identities of the parties involved in a transaction, namely, the sender (also called the "transferrer") and receiver (also called the "transferee"). Referring again to the example above, an "anonymous" transfer of ten tokens between Alice and Bob may reveal that a transfer of ten tokens has taken place. However, it will not reveal that Alice and Bob were the parties involved in the transfer.

Methodologies for Conducting Confidential Transfers

Blockchains are increasingly being used to store data of a sensitive nature. A number of cryptographic techniques, such as zero-knowledge proof systems, have been proposed to enhance privacy on public blockchains. Unfortunately, most of these cryptographic techniques require "heavy" on-chain computation, making them difficult to implement, slow, and costly in terms of consumption of computational resources.

A layer-1 blockchain (also called an "L1 blockchain") includes or supports features that allow the base protocol to be improved, thereby making the overall system more scalable. While these features are not the focus of the present disclosure, several common features are changes in the consensus protocol (e.g., from proof-of-work to proof-of-stake) and sharding. These improvements make L1 blockchains suitable for serving as the compute layer for a cryptographic protocol (also called a "privacy protocol" or simply "protocol") that can support a private ledger-based payment system. The terms "private ledger-based payment system" or simply "private payment system" may be used to refer to a payment system with at least one of two properties, namely, confidentiality and anonymity, that is at least partially implemented using a ledger-based architecture. Preferably, developers who utilize a blockchain should be given the option to create private tokens that can be transferred with one or both of these properties. The present disclosure pertains to enabling confidential transactions. The ZK-Token Program has been developed to allow the transfer of tokens in a confidential way.

At a high level, the ZK-Token Program is based on a protocol that is designed to interoperate with the Token Program. Tokens for the ZK-Token Program may be enabled for any existing token mint with the Token Program. For the purpose of illustration, tokens for the ZK-Token Program may be referred to as "confidential tokens" or "ZK tokens," and tokens for the Token Program may be referred to as "non-confidential tokens" or "SPL tokens," even though the tokens themselves are neither confidential nor non-confidential. Instead, tokens for the ZK-Token Program can be used in confidential transactions while tokens for the Token Program can be used in non-confidential transactions.

Once enabled, an account for the ZK-Token Program can be created from any account for the Token Program. Thus, each account with which confidential transactions can be completed may be associated with an account with which non-confidential transactions can be completed. To accomplish this, the address of a ZK-Token Program account can be derived (e.g., as a Program Derived Address) based on the account and mint for the corresponding Token Program account. Specifically, the address of a ZK-Token Program account can be derived based on (i) the account address for the corresponding Token Program account and (ii) the mint address for the corresponding Token Program account. In some embodiments, addresses of ZK-Token Program accounts are derived such that the corresponding Token Program accounts are readily identifiable. In other embodiments, addresses of ZK-Token Program accounts are derived such that relationships with the corresponding Token Program accounts are obfuscated (and therefore, one could not visually or programmatically identify the Token Program account that corresponds to a given ZK-Token Program account). For convenience, accounts associated with the ZK-Token Program may be referred to as "ZK-token accounts," and accounts associated with the Token Program may be referred to as "token accounts." Creation may be performed automatically, for example, for all token accounts managed through the Token Program. Thus, a ZK-token account may be automatically created whenever a token account is initialized for the Token Program in some embodiments. Alternatively, creation may be done in response to receiving an input (e.g., indicative of a request from a user to do so). Thus, owners of token accounts may have the option of initializing ZK-token accounts. After ZK-token accounts are created for the ZK-Token Program, funds can be independently transferred from token accounts and the corresponding ZK-token accounts. Between token accounts, funds can be transferred non-confidentially. Between ZK-token accounts, funds can be transferred confidentially as further discussed below.

Regarding the underlying cryptography, the protocol is designed to serve as a layer of encryption on top of SPL tokens. It can rely on, or make use of, multiple "lightweight" cryptographic objects: an additively homomorphic encryption scheme and a corresponding proof system. For example, embodiments may utilize a variant of the ElGamal encryption scheme for the former and an adaptation of the Bulletproofs system for the latter. Both of these cryptographic objects require fewer computational resources than more advanced cryptographic objects such as general-purpose Succinct Non-Interactive Arguments of Knowledge (also called "SNARKs"), and therefore are generally considered to be "lightweight" in comparison to these advanced cryptographic objects. Moreover, these cryptographic objects can be implemented on a pairing-free elliptic curve such as Curve 25519. This may be particularly beneficial if the underlying system already uses that pairing-free elliptic curve for other operations, such as generating cryptographic signatures with optimized signature verification and proof verification.

A. Overview of Protocol

In this section, the main intuition behind the underlying cryptograph that is used in the ZK-Token Program is described. A description of the application programming interface (API) used by the Token Program is provided, and then additional cryptographic features that can be added to the Token Program towards the ZK-Token Program are described.

There are two main data structures that are used in the Token Program. For the purpose of illustration, these data structures may be referred to as "mint" and "account." The mint data structure can be used to store the global information for a particular class of tokens as follows:

Mint Data Structure:
- Address: The address of the global information.
- Authority: The address of the "owner" of the mint.
- Supply: The total supply of tokens.

Meanwhile, the account data structure can be used to store the token balance of a user as follows:

Account Data Structure:
- Address: The address of the account information.
- Mint: The address of the mint that is associated with this account.
- Owner: The address of the owner account that owns this account.
- Balance: The balance of tokens that this account holds.

A user may be able to initialize creation of an account data structure by submitting an initialization instruction. For example, the user may indicate through an interface generated by a payment system that she is interested in creating a token account, and then upon receiving the input, the payment system may establish that the user is associated with an account for the Token Program and then generate the initialization instruction. Said another way, in response to receiving the input, the payment system may establish that the user is associated with an account for the Token Program that permits non-confidential transfers of tokens and then generate the initialization instruction for initializing an account for the ZK-Token Program. The initialization instruction may specify (i) an account address for the account data, (ii) a mint address for the corresponding mint, and (iii) an owner address for the owner. FIG. 1 includes a high-level diagrammatic illustration that shows how a token account can be created for the Token Program using an initialization instruction (and then how a corresponding ZK-token account can be created as further discussed below).

With the mint and account data structures, users may be able to interact with the corresponding token accounts on the blockchain using the following instructions:

- InitializeMint(addr, auth): Creates a new token mint by initializing a mint data structure at the address addr with a specified mint authority auth.
- InitializeAccount(addr, mint): Creates a new token account by initializing an account data structure associated with the specified mint authority mint at the address addr.
- MintTo (addr, amt, $\sigma_{mint\text{-}auth}$): Mints the specified amount amt of tokens to the token account at the address addr. The Token Program may process this instruction only if the specified signature $\sigma_{mint\text{-}auth}$ verifies under the token mint authority's public key.
- Transfer(source, destination, amt, $\sigma_{sender}$): Transfers the amount amt of tokens from the specified source account source to the specified destination account destination. The Token Program may process this instruction only if the specified signature $\sigma_{sender}$ verifies under the source account owner's public key.
- CloseAccount(addr, $\sigma_{owner}$): Closes the account specified at the address addr. The Token Program may process this instruction only if the specified signature $\sigma_{owner}$ verifies under the account owner's public key.

B. Tokens with Encryption and Proofs

Since each account data structure is stored on the blockchain, any user may be able to look up the balance of other accounts. The ZK-Token Program may hide or obfuscate the balances: keep the balances in encrypted form. Consider the following example of an account data structure:

Account Data Structure:
- Address: EzMCP3PVVKZD4YFXhJNKhgwMihuxxeFqH4F6uPxFxFAe
- Mint: s9vMFrzaCERmJfrF4H2FYD4KCoNKY11McCe8BenwNYB
- Owner: 5vBrLAPeMjJr9UfssGbjUaBmWtrXTg2vZuMN6L4c8HE6
- Balance: 50

To hide the account balance, the balance can be encrypted under the owner's public key before storing this information on the blockchain as follows:

Account Data Structure:
- Address: EzMCP3PVVKZD4YFXhJNKhgwMihuxxeFqH4F6uPxFxFAe
- Mint: s9vMFrzaCERmJfrF4H2FYD4KCoNKY11McCe8BenwNYB
- Owner: 5vBrLAPeMjJr9UfssGbjUaBmWtrXTg2vZuMN6L4c8HE6
- Balance: Encrypt($pk_{owner}$, 50)

Similarly, encryption can be used to hide the transfer amounts in a transaction. Consider the following example of a transfer instruction:

Transfer(source, destination, amt, $\sigma_{sender}$):
- source: EzMCP3PVVkZD4YFXhJNKhgwMihuxxeFqH4F6uPxFxFAe destination:
0x89205A3A3b2A69De6Dbf7f01ED13B2108B2c43e7
amt: 10

To hide the transaction amount, the amount can be encrypted under the sender's public key before the transaction is submitted to the blockchain as follows:

Transfer(source, destination, amt, $\sigma_{sender}$):
source:
EzMCP3PVVKZD4YFXhJNKhgwMihuxxeFqH4F6uPxFxFAe
destination:
0x89205A3A3b2A69De6Dbf7f01ED13B2108B2c43e7
amt: Encrypt($pk_{owner}$, 10)

By encrypting account balances and transfer amounts, confidentiality can be added to the Token Program.

C. Linear Homomorphism

One problem with the aforementioned approach to encryption is that the Token Program cannot detect or add transaction amounts to ZK-token accounts since all of the values are in encrypted form. This is why a separate program, namely, the ZK-Token Program, was created. One way to resolve this issue is to use an encryption scheme that is linearly homomorphic. One example of a linearly homomorphic encryption scheme is the ElGamal encryption scheme. An encryption scheme is linearly homomorphic if for any two numbers $x_0$, $x_1 \in \mathbb{Z}_p$ and their encryptions $ct_0$=Encrypt(pk,$x_0$), $ct_1$=Encrypt(pk, $x_1$) under the same public key, there exists ciphertext-specific add and subtract operations such that:

$$\text{Decrypt}(sk, ct_1 + ct_2) = x_0 + x_1, \text{ and}$$

$$\text{Decrypt}(sk, ct_1 - ct_2) = x_0 - x_1.$$

In other words, a linearly homomorphic encryption scheme allows numbers to be added and subtracted in encrypted form. The sum and difference of the individual encryptions of $x_0$ and $x_1$ result in a ciphertext that is equivalent to an encryption of the sum and the difference of the individual numbers $x_0$, $x_1$.

By using a linearly homomorphic encryption scheme to encrypt balances and transfer amounts, the ZK-Token Program is able to process balances and transfer amounts in encrypted form. Since linear homomorphism holds only when ciphertexts are encrypted under the same public keys, the transfer amount may be encrypted under the sender public key and receiver public key as follows:

Transfer(source, destination, amt, $\sigma_{sender}$):
source:
EzMCP3PVVKZD4YFXhJNKhgwMihuxxeFqH4F6uPxFxFAe
destination:
0x89205A3A3b2A69De6Dbf7f01ED13B2108B2c43e7
amt: Encrypt($pk_{sender}$, 10), Encrypt($pk_{receiver}$, 10)

Upon receiving a transfer instruction in this form, the ZK-Token Program can subtract and add ciphertexts to the source and destination accounts accordingly. More specifically, the ZK-Token Program can subtract and add ciphertexts to the source and destination accounts as follows:

$Account_{source}$:
Address:
EzMCP3PVVkZD4YFXhJNKhgwMihuxxeFqH4F6uPxFxFAe
Mint:
Es9vMFrzaCERmJfrF4H2FYD4KCoNKY11McCe8BenwNYB
Owner:
5vBrLAPeMjJr9UfssGbjUaBmWtrXTg2vZuMN6L4c8HE6
Balance: Encrypt($pk_{sender}$, 50)−Encrypt($pk_{sender}$, 10)≈Encrypt($pk_{sender}$, 40)

$Account_{destination}$:
Address:
EzMCP3PVVkZD4YFXhJNKhgwMihuxxeFqH4F6uPxFxFAe
Mint:
Es9vMFrzaCERmJfrF4H2FYD4KCoNKY11McCe8BenwNYB
Owner:
5vBrLAPeMjJr9UfssGbjUaBmWtrXTg2vZuMN6L4c8HE6
Balance: Encrypt($pk_{receiver}$, 50)+Encrypt($pk_{receiver}$, 10)≈Encrypt($pk_{receiver}$, 60)

D. Zero-Knowledge Proofs

Another problem with encrypting account balances and transfer amounts is that the Token Program cannot check the validity of each transfer amount. For instance, a user whose account has a balance of 50 tokens should not be able to transfer 70 tokens to another account. For SPL tokens, the Token Program can easily determine whether there are sufficient funds in the account since the balance is publicly known. However, if the account balances and transfer amounts are encrypted, then these values will be hidden to the Token Program itself, preventing it from verifying the validity of a transaction. Accordingly, the ZK-Token Program may require that transfer instructions include zero-knowledge proofs that validate the correctness of the transfer. There are several key components that may be required for a transfer instruction, namely, a range proof and an equality proof.

Range proofs are special types of zero-knowledge proof systems that allow users to generate a range proof $\pi_{range}$ that a ciphertext ct encrypts a value $x \in \mathbb{Z}$ that falls in a specified range $\ell$, ,$u \in \mathbb{Z}$ as follows:

$$\text{Verify}_{\ell,u}(ct, \pi_{range}) = 1 \Leftrightarrow ct = \text{Encrypt}(pk, x) \text{ and } \ell \leq x < u.$$

The zero-knowledge property will guarantee that $\pi_{range}$ does not reveal the actual value of x, but only that $\ell \leq x < u$. The ZK-Token Program may require that each transfer instruction contain a range proof that certifies:

There are enough funds in the source account. If the encrypted balance of the source account is represented as $ct_{source}$ and the encrypted amount of the transfer is represented as $ct_{trans\text{-}amt}$, then the ZK-Token Program may require that the range proof certify that $ct_{source}$−$ct_{trans\text{-}amt}$=Encrypt(pk sender, x) such that $0 \leq x < 2^{64}$. By verifying the range proof, the ZK-Token Program can check that there are sufficient funds in the source account.

The transfer amount itself is a positive 64-bit number. If the encrypted amount of a transfer is represented as $ct_{trans\text{-}amt}$, then the ZK-Token Program may require that the range proof certify that $ct_{trans\text{-}amt}$=Encrypt(pk sender, x) such that $0 \leq x < 2^{64}$. By verifying the range proof, the ZK-Token Program can check that the transfer amount is a positive number, and therefore cannot create a negative transfer.

Figure 2:
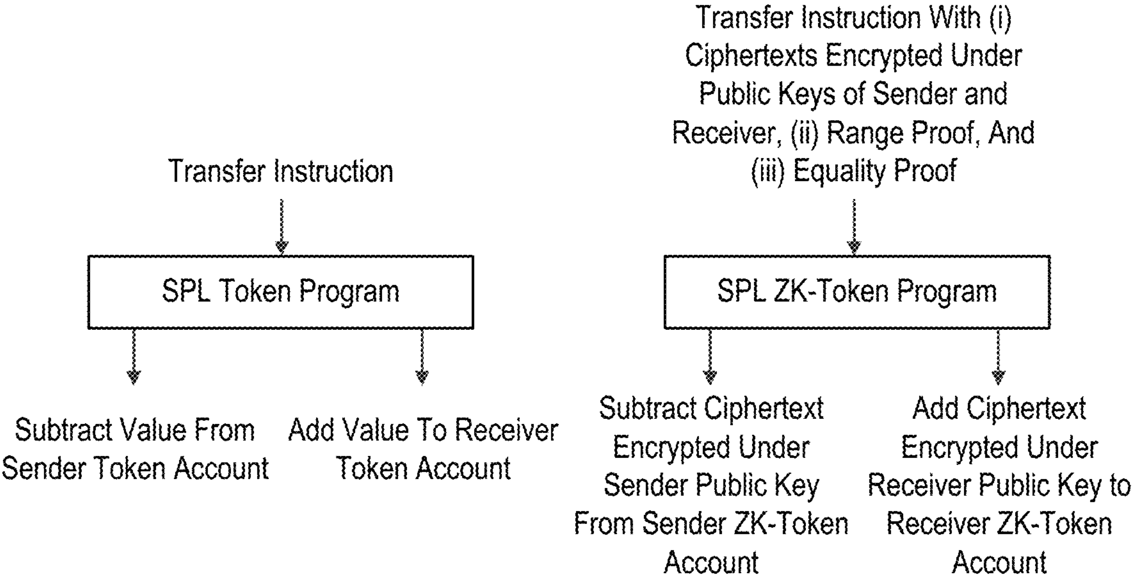
FIG. 2 includes a high-level diagrammatic illustration that shows how transfer instructions for the Token Program may simply indicate the value to be transferred from the sender token account to the receiver token account, while transfer instructions for the ZK-Token Program may include (i) ciphertexts encrypted under the public keys of the sender and receiver, (ii) a range proof, and (iii) an equality proof.

As mentioned above, a transfer instruction can include two ciphertexts of the transfer value x, namely, a first ciphertext under the sender public key $ct_{sender}$=Encrypt($pk_{sender}$, x) and a second ciphertext under the receiver public key $ct_{receiver}$=Encrypt($pk_{receiver}$,x). However, a malicious user could encrypt two different values for $ct_{sender}$ and $ct_{receiver}$. Therefore, the ZK-Token Program may require that each transfer instruction includes an equality proof $\pi_{eq}$ certifying that the two ciphertexts encrypt the same value. FIG. 2 includes a high-level diagrammatic illustration that shows how transfer instructions for the Token Program may simply indicate the value to be transferred from the sender token account to the receiver token account, while transfer instructions for the ZK-Token Program may include (i) ciphertexts encrypted under the public keys of the sender and receiver, (ii) a range proof, and (iii) an equality proof. The equality proof $\pi_{eq}$ can be represented as follows:

$$ct_{sender} = \text{Encrypt}(pk_{sender}, x_0),\ ct_{receiver} = \text{Encrypt}(pk_{receiver}, x_1)$$

$$\text{such that } x_0 = x_1.$$

The zero-knowledge property will guarantee that $\pi_{eq}$ does not reveal the actual values of $x_0$ and $x_1$, but only the fact that $x_0=x_1$.

Further information regarding these proofs and respective verification algorithms can be found below.

E. Usability Features

To gain widespread adoption, the ZK-Token Program may offer several features in addition to those discussed above, so as to improve usability. For the purpose of illustration, two examples of usability features—namely, encryption key support and balance determination—are described below.

i. Encryption Key Support

In the embodiments set forth above, the public key of the owner was used as the "signing key" to encrypt the balance of an account. However, in operation, the ZK-Token Program may use a separate account-specific encryption key ek to encrypt the account balances as follows:

Account Data Structure:
- Address: EzMCP3PVVKZD4YFXhJNKhgwMihuxxeFqH4F6uPxFxFAe
- Mint: Es9vMFrzaCERmJfrF4H2FYD4KCoNKY11McCe8BenwNYB
- Owner: 5vBrLAPeMjJr9UfssGbjUaBmWtrXTg2vZuMN6L4c8HE6
- EncryptionKey: ek
- Balance: Encrypt(ek, 50)

The encryption key ek can be publicly set by the owner of the account by including it as part of an initialization instruction. A corresponding decryption key dk can be stored privately on a client-side digital wallet (or simply "wallet").

In general, the use of a single public-private key pair for signature generation and encryption is discouraged due to potential security vulnerabilities. Therefore, the ZK-Token Platform may use separate dedicated key pairs for just encryption. Importantly, the API of the ZK-Token Program may be designed to be as general as possible for developers who are interested in participating in confidential transactions. Separate dedicated keys for signing transactions and decrypting transaction amounts may allow for a more flexible API.

In a potential application, the decryption key dk can be shared among multiple users (also called "regulators") that should have access to an account balance. Although these users can decrypt account balances, only the actual owner of the account that has access to the signing key sk may be able to sign a transaction that initiates a transfer of tokens. The protocol may also allow the owner of an account to submit a new encryption key ek' via an update account instruction to place the existing encryption key ek. The update account instruction can, for example, be used to revoke another user's access to an account balance.

ii. Balance Determination

One way that a malicious attacker could compromise the usability of a ZK-token account is by taking advantage of the "front-running problem." Zero-knowledge proofs are verified with respect to the encrypted balance of an account. Suppose that a first user (Alice) generates a proof with respect to her current encrypted account balance. If another user (Bob) transfers some tokens to Alice and Bob's transaction is processed first, then Alice's transaction will be rejected by the ZK-Token Program as the proof will not verify with respect to the newly updated ciphertext.

Under normal circumstances, in response to a rejection by the ZK-Token Program, Alice could simply look up the newly updated ciphertext and submit a new transaction. However, if a malicious attacker continuously floods the network with transfers to Alice's account, then the account may theoretically become unusable. While such an attack is unlikely due the required amount of computational resources, an account may theoretically be forcibly disabled for an extended period of time due to repeated rejections of transfers. To prevent this type of attack, the account data structure can be modified such that the encrypted balance of the account is divided into two separate components, namely, the pending balance and available balance. More specifically, the account data structure could be modified as follows:

Account Data Structure:
- Address: EzMCP3PVVKZD4YFXhJNKhgwMihuxxeFqH4F6uPxFxFAe
- Mint: Es9vMFrzaCERmJfrF4H2FYD4KCoNKY11McCe8BenwNYB
- Owner: 5vBrLAPeMjJr9UfssGbjUaBmWtrXTg2vZuMN6L4c8HE6
- EncryptionKey: ek
- PendingBalance: Encrypt(ek, 10)
- AvailableBalance: Encrypt(ek, 50)

Any outgoing funds from an account can be subtracted from its available balance, and any incoming funds to an account can be added to its pending balance.

As an example, consider a transfer instruction that moves ten tokens from a sender's account to a receiver's account as follows:

Transfer(source, destination, amt, $\sigma_{sender}$):
- source: EzMCP3PVVKZD4YFXhJNKhgwMihuxxeFqH4F6uPxFxFAe
- destination: 0x89205A3A3b2A69De6Dbf7f01ED13B2108B2c43e7
- amt: Encrypt($ek_{sender}$, 10), Encrypt($ek_{receiver}$, 10), Upon receiving this transfer instruction and verifying its validity, the ZK-Token Program can subtract the encrypted amount from the sender's available balance and add the encrypted amount to the receiver's pending balance as follows:

$Account_{source}$:
  Address: EzMCP3PVVkZD4YFXhJNKhgwMihuxxeFqH4F6uPxFxFAe
  Mint: Es9vMFrzaCERmJfrF4H2FYD4KCoNKY11McCe8BenwNYB
  Owner: 5vBrLAPeMjJr9UfssGbjUaBmWtrXTg2vZuMN6L4c8HE6
  EncryptionKey: $ek_{sender}$
  PendingBalance: Encrypt($ek_{sender}$, 10)
  AvailableBalance: Encrypt($ek_{sender}$, 50)−Encrypt($ek_{sender}$, 10)≈Encrypt($ek_{sender}$, 40)

$Account_{destination}$:
  Address: EzMCP3PVVkZD4YFXhJNKhgwMihuxxeFqH4F6uPxFxFAe
  Mint: Es9vMFrzaCERmJfrF4H2FYD4KCoNKY11McCe8BenwNYB
  Owner: 5vBrLAPeMjJr9UfssGbjUaBmWtrXTg2vZuMN6L4c8HE6
  EncryptionKey: $ek_{receiver}$
  PendingBalance: Encrypt($ek_{receiver}$, 10)+Encrypt($ek_{receiver}$, 10)≈Encrypt($ek_{receiver}$, 20)
  AvailableBalance: Encrypt($ek_{receiver}$, 10)

This modification removes the sender's ability to change the receiver's available balance of a source account. As range proofs are generated and verified with respect to the available balance, this prevents a transaction generated by a user from being invalidated due to another transaction that is generated by another user.

The pending balance of an account can be merged into its available balance via an apply pending balance instruction (also called an "apply pending instruction," "apply balance instruction," or simply "apply instruction"). The apply instruction may only be authorizable by the owner of the account. Upon receiving an apply instruction and verifying that the owner of the account signed the transaction, the ZK-Token Program can add the pending balance into the available balance as follows:

Account Data Structure:
  Address: EzMCP3PVVkZD4YFXhJNKhgwMihuxxeFqH4F6uPxFxFAe
  Mint: Es9vMFrzaCERmJfrF4H2FYD4KCoNKY11McCe8BenwNYB
  Owner: 5vBrLAPeMjJr9UfssGbjUaBmWtrXTg2vZuMN6L4c8HE6
  EncryptionKey: ek
  PendingBalance: Encrypt(ek, 0)
  AvailableBalance: Encrypt(ek, $50_{available}$)+Encrypt(ek, $10_{pending}$)≈Encrypt(ek, 60)

F. Cryptographic Optimizations

A known limitation of using linearly homomorphic encryption schemes is the inefficiency of decryption. As an example, the ElGamal encryption scheme is defined over a cyclic group G of prime order $p \in \mathbb{N}$. . If $ct_x$ is representative of the ElGamal encryption of a value $x \in \mathbb{Z}$, , then in an ElGamal encryption scheme, a successful decryption of $ct_x$ will result in the group element $x \cdot G$, where G is a fixed generator for $\mathbb{G}$. . To completely recover the originally encrypted value x, it must be recovered from $x \cdot G$, which is a difficult computational programmed called the "discrete log problem" that requires an exponential time to compute.

To deal with this problem of costly recovery, cryptographic protocols generally restrict content to be encrypted to small numbers. However, the Token Program may support larger numbers (e.g., 64-bit transfer amounts), so the ZK-Token Program should preferably also support larger numbers (e.g., 64-bit transfer amounts). Even with modern hardware, fully decrypting 64-bit numbers from an ElGamal decryption is intractable. This means that given a transfer of any large amount of tokens, the receiver cannot decrypt the transfer amount efficiently. An example of a transfer instruction follows:

Transfer(source, destination, amt, $\sigma_{sender}$):
  source: EzMCP3PVVKZD4YFXhJNKhgwMihuxxeFqH4F6uPxFxFAe
  destination: 0x89205A3A3b2A69De6Dbf7f01ED13B2108B2c43e7
  amt: Encrypt($ek_{sender}$, $x_{lo}$), Encrypt($ek_{sender}$,$x_{hi}$)
  Encrypt($ek_{receiver}$,$x_{lo}$), Encrypt($ek_{receiver}$,$x_{hi}$)
  Encrypt($ek_{auditor}$,$x_{lo}$), Encrypt($ek_{auditor}$, $x_{hi}$)

Since the encrypted values of ElGamal ciphertexts are 32-bit numbers, the encrypted values can be decrypted and recovered by the receiver and auditor. Instead of requiring that the range proof associated with transfer instruction certify that ciphertexts encrypt 64-bit transfer amounts, the ZK-Token Program may require that it certifies multiple 32-bit transfer amounts. Even if the transfer amount $x_{tx\text{-}amt}$ is encrypted as two different ciphertexts, these ciphertexts can be homomorphically merged into a single encryption of $x_{tx\text{-}amt}$ as follows:

$$\begin{aligned}\text{Encrypt}(ek_{sender}, x_{lo}) + 2^{32} \cdot \text{Encrypt}(ek_{sender}, x_{hi}) &= \text{Encrypt}\left(ek_{sender}, x_{lo} + 2^{32} \cdot x_{hi}\right) \\ &= \text{Encrypt}(ek_{sender}, x_{tx-amt})\end{aligned}$$

Upon receiving a transfer instruction, the ZK-Token Program can merge the corresponding ciphertexts and then subtract and add the ciphertexts to the source and destination account balances, respectively. Accordingly, in response to receiving input indicative of a request to initiate a confidential transfer from a first account associated with a sender to a second account associated with a recipient, the ZK-Token Program can merge a first ciphertext encrypted under a public cryptographic key of the sender with a second ciphertext encrypted under a public cryptographic key of the recipient, subtract the merged ciphertext from the encrypted balance of the first account, and add the merged ciphertext to the encrypted balance of the second account.

One challenge in designing a private payment system is minimizing the size of each transaction. In the ZK-Token Program, a number of optimizations are made the reduce transaction size. Among these optimizations, a significant amount of savings stem from the use of a twisted ElGamal encryption scheme. In the twisted ElGamal encryption scheme, a ciphertext is divided into two components, namely, a Pedersen commitment and decryption handle. More specifically, the ciphertext is divided into (i) a Pedersen commitment of the encrypted message, which is independent of the public key; and (ii) a decryption handle that encodes the encryption randomness with respect to a specific public key, and is independent of the encrypted message. Further details regarding the twisted ElGamal encryption scheme are provided below.

The use of twisted ElGamal encryption instead of standard ElGamal encryption provides several benefits. As an example, range proof systems such as Bulletproofs can be used almost directly on twisted ElGamal encryption. These systems care designed specifically for Pedersen commitments and are generally not compatible with standard ElGamal encryption without additional proof components that serve as a conceptual "bridge" between the Pedersen commitments and ElGamal ciphertexts. In a twisted ElGamal encryption scheme, transactions are already encoded as Pedersen commitments, and therefore there is no need for these extra proof components.

The use of twisted ElGamal encryption also eliminates the need for equality proofs. As mentioned above, twisted ElGamal ciphertexts can be divided into two components, namely, Pedersen commitments and decryption handles. Since Pedersen commitments are independent of the public keys for which the ciphertexts are encrypted under, these proof components can be shared among multiple ciphertexts that encrypt the same transactions. For example, consider the following transfer instruction:

Transfer(source, destination, amt, $\sigma_{sender}$):
  source:
    EzMCP3PVVkZD4YFXhJNKhgwMihuxxeFqH4F6uPxFxFAe
  destination:
    0x89205A3A3b2A69De6Dbf7f01ED13B2108B2c43e7
  amt: Encrypt($ek_{sender}$,$x_{lo}$), Encrypt($ek_{sender}$,$x_{hi}$)
    Encrypt($ek_{receiver}$,$x_{lo}$), Encrypt($ek_{receiver}$,$x_{hi}$)
    Encrypt($ek_{auditor}$,$x_{lo}$), Encrypt($ek_{auditor}$,$x_{hi}$)

Instead of including six ciphertexts (64 bytes each) on a single instruction, a single commitment for each $x_{lo}$, $x_{hi}$ can be generated and then decryption handles can be included for each of these two commitments as follows:

Transfer(source, destination, amt, $\sigma_{sender}$):
  source:
    EzMCP3PVVkZD4YFXhJNKhgwMihuxxeFqH4F6uPxFxFAe
  destination:
    0x89205A3A3b2A69De6Dbf7f01ED13B2108B2c43e7
  amt:
    Commitments: PedComm($x_{lo}$), PedComm($x_{hi}$)
    Handles: DecHandle$_{x_{lo}}$($ek_{sender}$), DecHandle$_{x_{hi}}$($ek_{sender}$)
      DecHandle$_{x_{lo}}$($ek_{receiver}$), DecHandle$_{x_{hi}}$($ek_{receiver}$)
      DecHandle$_{x_{lo}}$($ek_{auditor}$), DecHandle$_{x_{hi}}$($ek_{auditor}$)

Each decryption handle can be combined with the corresponding Pedersen commitment to form a complete ElGamal ciphertext. For example, the auditor can use its decryption key $dk_{auditor}$ to decrypt the pairs as follows:

Decrypt($dk_{auditor}$, PedComm($x_{lo}$), DecHandle$_{x_{lo}}$($ek_{auditor}$)=$x_{lo}$ Decrypt($dk_{auditor}$, PedComm($x_{hi}$), DecHandle$_{x_{hi}}$($ek_{auditor}$))=$x_{hi}$ As Pedersen commitment and decryption handled are 32 bytes each, this way of encryption transaction amounts can result in savings in the total ciphertext size associated with a transfer instruction. Importantly, since Pedersen commitments are shared among multiple ciphertexts, there is no need for equality proofs to be included in transfer instructions. A transfer instruction will still require proofs that each decryption handle was generated correctly, but these proofs may be much smaller in size in comparison to equality proofs. Further details on proof requirements for transfer instructions are provided below.

G. Encryption in ZK-Token Program

In this section, the twisted ElGamal encryption scheme is further discussed in the context of the ZK-Token Program. Throughout this section, the twisted ElGamal encryption scheme is described over an abstract cyclic group $(\mathbb{G},+)$ of prime order $p\in\mathbb{N}$. . In operation, the twisted ElGamal encryption scheme may be implemented otherwise, such as using a Ristretto group implementation over Curve25519. Following the implementation convention, elements in $\mathbb{Z}_p$ are referred to as "scalars" and elements in $\mathbb{G}$ are referred to as "points." Also, pk and sk are used to denote the public encryption key and secret decryption key, respectively. This is in contrast to Section E, where ek and dk were used to denote the encryption and decryption keys, respectively, to distinguish them from the user's public and signing keys.

In cryptography, a commitment scheme is a message encoding algorithm that has the following syntax:

Commit(x,r)→C: On input of a scalar message x and a randomly generated "opening" r, the algorithm returns an encoding C that is generally referred to as a "commitment."

A commitment scheme is considered secure if it has the following properties:

Binding: Given a commitment C, it is difficult to find two message-opening pairs $(x_0,r_0)$, $(x_1,r_1)$ such that Commit$(x_0,r_0)$=Commit$(x_1,r_1)$; and Hiding: As long as an opening r is generated from a proper randomness source, a commitment C does not reveal any information about the committed scalar message x.

The simplest example of a cryptographic commitment scheme is one that uses a cryptographic hash function H as follows:

$$\text{Commit}(x, r) = H(x\|r),$$

where the committed scalar message x and opening r are arbitrary bit-strings. The cryptographic hash function H can be collision resistant, and therefore it may be difficult to find two message-opening pairs $(x_0,r_0)$, $(x_1,r_1)$ such that $H(x_0\|r_0)=H(x_1\|r_1)$. Furthermore, if the opening r is sufficiently long, then the output of the cryptographic hash function H will not reveal information about the committed scalar message x.

The ZK-Token Program may use a specific commitment scheme called the "Pedersen commitment scheme." Pedersen commitments are defined with respect to two fixed group elements $G, H\in\mathbb{G}$. . In the Pedersen commitment scheme, the commitment algorithm can be defined as follows:

Commit(x,r)→C: On input of a scalar message $x \in \mathbb{Z}_p$ and a randomly generated opening $r \in \mathbb{Z}_p$, the algorithm returns $$C = x \cdot G + r \cdot H \in \mathbb{G}_{\pi}.$$

Over any cryptographically robust group $\mathbb{G}$., the Pedersen commitment scheme can satisfy the aforementioned properties of binding and hiding.

Pedersen commitments can be incorporated into the protocol since the algebraic structure makes it convenient to design zero-knowledge proof systems. In the setting of the ZK-Token Program, zero-knowledge proofs may be required to work over ciphertexts, not commitments. However, if a specialized encryption scheme—like the twisted ElGamal encryption scheme—is used, then proof systems that are designed for Pedersen commitments for ciphertexts can be used almost directly.

In the twisted ElGamal encryption scheme, a ciphertext can be viewed as a wrapper around a Pedersen commitment. In the setting of Pedersen commitments, the twisted ElGamal encryption scheme can be defined with respect to two fixed group elements G, $H \in \mathbb{G}$ as follows:

KeyGen( )→(pk, sk): The key generation algorithm can generate a random scalar $s \leftarrow_R \mathbb{Z}_p$. . The key generation algorithm can compute $P = s^{-1} \cdot H$ and set pk=P and sk=s.

Encrypt(pk, x)→ct: The encryption algorithm can take in a public key $pk = P \in \mathbb{G}$ and a message (e.g., a 32-bit or 64-bit number) represented as a scalar $x \in \mathbb{Z}_p$ to be encrypted. The encryption algorithm can sample a random scalar $s \leftarrow_R \mathbb{Z}_p$ and then compute the following components:

$$\text{Pedersen Commitment: } C = r \cdot H + x \cdot G, \text{ and}$$

$$\text{Decryption Handle: } D = r \cdot P.$$

As output, the encryption algorithm may return ciphertext ct=(C,D). Decrypt(sk, ct)→x:L The decryption algorithm can take in a secret key sk=s and a ciphertext ct=(C,D) as input. The decryption algorithm can compute $C = C - s \cdot D \in \mathbb{G}$, , and then the decryption algorithm can solve the discrete log problem to recover $x \in \mathbb{Z}_p$ for which x·G=P.

The correctness of the decryption algorithm can be verified relatively easily. For example, let pk=P, sk=s be a public-secret key pair, and let ct=(C=r·H+x·G, D=r·P) be a properly encrypted ciphertext of a scalar message $x \in \mathbb{Z}_p$. . Then, a proper decryption of the ciphertext produces:

$$\begin{aligned} C - s \cdot D &= (rH + xG) - s \cdot (rP) \\ &= rH + xG - r \cdot (sP) \\ &= rH + xG - rH \\ &= xG \end{aligned}$$

Assuming that the discrete log is solved correctly, the decryption algorithm can recover the original scalar message $x \in \mathbb{Z}_p$. .

Let $\mathbb{G}$, be a cyclic group of prime order $p \in \mathbb{N}$, , and let $G \in \mathbb{G}$, be any fixed point in $\mathbb{G}$, generally referred to as the "generator" for $\mathbb{G}$, . In this scenario, any point $C \in \mathbb{G}$, can be represented as a multiple of G, namely, as x·G=C. The term "discrete log problem" refers to the computational task of recovering x given a generator G and target C:

Input: Generator $G \in \mathbb{G}$, and target $C \in \mathbb{G}$, , and

Output: $x \in \mathbb{Z}_p$ such that x·G=C.

If C is an arbitrary random element in the group G, then this problem is known to be difficult to compute. However, if there is a guarantee that the unique scalar $x \in \mathbb{Z}_p$ for which C=x·G is a small number (e.g., $0 \le x \le 2^{32}$), then the problem can be solved efficiently.

Suppose that x is a 32-bit number. The simplest way to solve the discrete log problem is to enumerate through all possible values $0 \le x \le 2^{32}$ and test for the relation C=x·G. Although this "brute force" way of computing the discrete log may be technically feasible with modern hardware, the problem can be solved more efficiently by relying on the space-time tradeoff. Let $x_{lo}$, $x_{hi}$ be two numbers represented by the least and most significant 16 bits of x such that $x = x_{lo} + 2^{16} \cdot x_{hi}$. Then the discrete log relation can be represented as:

$$\begin{aligned} C &= x \cdot G \\ &= (x_{lo} + 2^{16} \cdot x_{hi}) \cdot G \\ &= x_{lo} \cdot G + 2^{16} \cdot x_{hi} \cdot G \end{aligned}$$

Using this relation, the discrete log problem can be solved by first computing all possible values of $2^{16} \cdot x_{hi} \cdot G$ for $x_{hi} = 0, 1, \ldots, 2^{16}-1$ and then solving for $x_{lo}$. More specifically, $x_{lo}$ can be solved as follows:

ComputeDiscreteLog(G,C):

Step 1: Instantiate a data structure (e.g., a look-up table). For $x_{hi} = 0, 1, \ldots, 2^{16}-1$, store the following key-value pairs:

key: $2^{16} \cdot x_{hi} \cdot G$, and value: $x_{hi}$.

Step 2: For $x_{lo} = 0, 1, \ldots, 2^{16}-1$, check whether a key $C - x_{lo} \cdot G$ exists in the data structure. If the key exists, then take the entry $x_{hi}$ and return $x = x_{lo} + 2^{16} \cdot x_{hi}$.

Note that the data structure in step 1 can be independent of the discrete log target $C \in \mathbb{G}$. . Therefore, the data structure can be pre-computed once offline and can be reused for multiple instances of discrete log with a fixed generator $G \in \mathbb{G}$. . In some embodiments, the data structure stores $2^{16}$ entries of 16-bit numbers, which translates to 130 kilobytes. The data structure could store a larger or smaller number of entries, however. With this amount of pre-computation, discrete log challenges can be solved in a matter of seconds.

Note also that the two-step algorithm described above divides the 32-bit number x into two 16-bit numbers $x_{lo}$, $x_{hi}$. This choice of numbers is purely for simplicity. The numbers $x_{lo}$, $x_{hi}$ can be chosen to be arbitrary $\ell_{lo}$ , and $\ell_{hi}$ -bit numbers for which $\ell_{lo} + \ell_{hi} = 32$. The numbers $\ell_{lo}$ and $\ell_{hi}$ define a space-time tradeoff in computing the discrete log problem. For instance, by setting $\ell_{lo}$ smaller and $\ell_{hi}$ larger, the discrete log problem can be solved in less than one second with larger pre-computed data.

H. Examples of Zero-Knowledge Proofs

In this section, details of examples of zero-knowledge proofs that can be used in the ZK-Token Program are provided. Generally, the ZK-Token program utilizes three types of proof systems: zero-balance proofs, equality proofs, and range proofs. Each of these proofs could be based on a standard or non-standard proof system in cryptography. As an example, for range proofs, the ZK-Token Program may use Bulletproofs but with its own customization or optimization.

The term "zero-knowledge proof system" can be used to refer to any cryptographic protocol between two entities, namely, a prover $\mathcal{P}$ and a verifier $\mathcal{V}$, that allows a given statement to be proven true without conveying information apart from the fact that the given statement is indeed true. A protocol may involve a number of rounds between the prover $\mathcal{P}$ and verifier $\mathcal{V}$ where these two entities send messages back and forth multiple times. In the context of the ZK-Token Program, the prover $\mathcal{P}$ may correspond to a client node and the verifier $\mathcal{V}$ may correspond to the ZK-Token Program itself that may run on multiple validator nodes. As it is difficult to coordinate multiple protocol rounds in this context, the focus here is on non-interactive proof systems that utilize at least two algorithms, a create algorithm and a verify algorithm. These two algorithms can operate as follows:

- Create(x,w)→π: The create algorithm can take, as input, a statement to be proved x and private information w. As output, the create algorithm can return a proof π.
- Verify(x,π)→T/F: The verify algorithm can take, as input, a statement to be verified x and a proof π. As output, the verify algorithm can produce an indication of whether the proof was accepted (i.e., was deemed true) or rejected (i.e., was deemed false).

The zero-knowledge proof systems that are used by the ZK-Token Program can be designed using the Fiat-Shamir heuristic, much like existing proof systems. The Fiat-Shamir heuristic is a general design principle for creating zero-knowledge proof systems with the following components:

1. Design an interactive "public-coin" protocol between a prover $\mathcal{P}$ and a verifier $\mathcal{V}$.. A public coin proof system refers to a protocol where at each round, the verifier $\mathcal{V}$ does nothing except send the prover $\mathcal{P}$ randomly generated "challenge" values.
2. Compile the interactive public-coin proof protocol into a non-interactive one by replacing the verifier's random challenges with a hash of the prover's prior messages.

The Fiat-Shamir heuristic is a popular design paradigm for zero-knowledge proof systems because interactive systems are generally more intuitive and easier to understand. Following standard convention, the following proof systems are presented as interactive protocols between the prover $\mathcal{P}$ and verifier $\mathcal{V}$.. These interactive protocols can be compiled into a non-interactive proof system using the Fiat-Shamir transformation.

i. Zero-Balance Proof

Intuitively, the zero-balance proof allows a prover $\mathcal{P}$ to demonstrate to a verifier $\mathcal{V}$ that a ciphertext (e.g., a twisted ElGamal ciphertext) encrypts the value zero under a specified public key. Formally, the zero-balance proof captures the following:

$$\mathcal{L}_{G,H}^{zero-balance} = \{u = (P, C, D) \in \mathbb{G}^3,\ w = s \in \mathbb{Z}_p \mid s \cdot P = H \wedge s \cdot D = C\}.$$

The language is defined with respect to two fixed generators G, H that define the encryption scheme. The group element P corresponds to a public key in the encryption scheme, and the field element s corresponds to its secret key. The elements C, D correspond to a Pedersen commitment and decryption handle that make up a single ciphertext. If the ciphertext ct=(C,D) is a proper encryption of zero, then its decryption must produce Decrypt(s, ct)=C−s·D=0·G=0 and hence s·D=C. The protocol for the zero-balance proof for the language $\mathcal{L}_{G,H}$ can be defined as follows:

| Prover(x, w) | | Verifier(x) |
|---|---|---|
| $y \leftarrow_R \mathbb{Z}_p$ | | |
| $Y_P \leftarrow y \cdot P$ | | |
| $Y_D \leftarrow y \cdot D$ | | |
| | $\xrightarrow{Y_P,\ Y_D}$ | |
| | | $c \leftarrow_R \mathbb{Z}_p$ |
| $z \leftarrow c \cdot s + y$ | $\xleftarrow{c}$ $\xrightarrow{z}$ | |
| | | $z \cdot P \stackrel{?}{=} c \cdot H + Y_P$ |
| | | $z \cdot D \stackrel{?}{=} c \cdot C + Y_D$ |

The protocol may follow a standard sigma protocol structure where the prover $\mathcal{P}$ first samples a random field element $y \leftarrow_R \mathbb{Z}_p$.. It then commits to this element by sending $Y_P$=y·P and $Y_D$=y·D to the verifier $\mathcal{V}$. Upon receiving a random challenge c, it can provide the verifier $\mathcal{V}$ with the masked secret key z=c·s+y. Finally, the verifier $\mathcal{V}$ can test the two relations s·P=H and s·D=C using the masked secret key z and the committed values $Y_P$, $Y_D$.

ii. Equality Proof

At the start of the protocol, the prover $\mathcal{P}$ and verifier $\mathcal{V}$ have access to a ciphertext (e.g., a twisted ElGamal ciphertext) and a Pedersen commitment. The goal of the prover $\mathcal{P}$ is to convince the verifier $\mathcal{V}$ that is knows a secret key and a Pedersen opening such that the ciphertext and Pedersen commitment decode to the same message. Formally, the language that is captured by the protocol can be specified as follows:

$$\mathcal{L}_{G,H}^{equality} = \left\{ \begin{array}{c} u = (P_{EG}, C_{EG}, D_{EG}, C_{Ped}) \in \mathbb{G}^4, \\ w = (s, x, r) \in \mathbb{Z}_p^3 \end{array} \middle| \begin{array}{c} s \cdot P_{EG} = H \wedge C_{EG} - s \cdot D_{EG} = x \cdot G \\ \wedge C_{Ped} = x \cdot G + r \cdot H \end{array} \right\}.$$

The language $$\mathcal{L}_{G,H}^{equality}$$

is specified by two group elements G, H∈ $\mathbb{G}$ that define the encryption and Pedersen commitments. The group element $P_{EG}$ corresponds to a public key in the encryption scheme (e.g., the twisted ElGamal encryption scheme), and the field element s corresponds to its secret key. The elements $C_{EG}$, $D_{EG}$ correspond to the ciphertext (e.g., the twisted ElGamal ciphertext), and the element $C_{Ped}$ corresponds to an additional Pedersen commitment. If the ciphertext $ct=(C_{EG}, D_{EG})$ and additional Pedersen commitment $C_{Ped}$ encode the same message x, then $C_{EG}-s\cdot D_{EG}=x\cdot G$ and $C_{Ped}=x\cdot G+r\cdot H$. The protocol for the equality proof for the language $$\mathcal{L}_{G,H}^{equality}$$

can be defined as follows:

| Prover(x, w) | | Verifier(x) |
|---|---|---|
| $y_s \leftarrow_R \mathbb{Z}_p$ | | |
| $y_x \leftarrow_R \mathbb{Z}_p$ | | |
| $y_r \leftarrow_R \mathbb{Z}_p$ | | |
| $Y_0 \leftarrow y_s \cdot P_{EG}$ | | |
| $Y_1 \leftarrow y_x \cdot G + y_s \cdot D_{EG}$ | | |
| $Y_2 \leftarrow y_s \cdot G + y_r \cdot H$ | | |
| | $\xrightarrow{Y_0,\, Y_1,\, Y_2}$ | |
| | | $c \leftarrow_R \mathbb{Z}_p$ |
| | $\xleftarrow{c}$ | |
| $z_s \leftarrow c \cdot s + y_s$ | | |
| $z_x \leftarrow c \cdot x + y_x$ | | |
| $z_r \leftarrow c \cdot r + y_r$ | | |
| | $\xrightarrow{z_s,\, z_x,\, z_r}$ | |
| | | $z_s \cdot P_{EG} \stackrel{?}{=} c \cdot H + Y_0$ |
| | | $z_x \cdot G + z_s \cdot D_{EG} \stackrel{?}{=} c \cdot C_{EG} + Y_1$ |
| | | $z_x \cdot G + z_r \cdot H \stackrel{?}{=} c \cdot C_{Ped} + Y_2$ |

As in the zero-balance argument protocol, the equality protocol can follow a standard sigma protocol structure where the prover $\mathcal{P}$ first samples random field elements $y_s$, $y_x$, $y_r$. It then commits to these elements by sending $Y_0=y_s\cdot P_{EG}$, $Y_1=y_x\cdot G+y_s\cdot D_{EG}$, and $Y_2=y_x\cdot G+y_r\cdot H$. Upon receiving a random challenge c, it can provide the verifier V with the masked secret key $z_s=c\cdot s+y$, $z_x=c\cdot x+y_x$, and $z_r=c\cdot r+y_r$. Finally, the verifier $\mathcal{V}$ can test the three relations associated with $$\mathcal{L}_{G,H}^{equality}$$

using the masked secret key z and the committed values $Y_0$, $Y_1$, $Y_2$.

iii. Validity Proof

In this section, the ciphertext validity protocol is further described. At the start of the protocol, the prover $\mathcal{P}$ and verifier $\mathcal{V}$ have access to two ciphertexts $ct_{lo}=(C_{lo},D_{lo})$ and $ct_{hi}=(C_{hi},D_{hi})$. The goal of the prover $\mathcal{P}$ in the protocol is to convince the verifier $\mathcal{V}$ that it knows valid randomness and message pairs $(r_{lo}, x_{lo})$ and $(r_{hi}, x_{hi})$ for the two ciphertexts. Formally, the ciphertext validity protocol captures the following language:

$$\mathcal{L}_{G,H}^{validity} = \left\{ \begin{matrix} u = (P, C_{lo}, D_{lo}, C_{hi}, D_{hi}) \in \mathbb{G}^5, \\ w = (r_{lo}, x_{lo}, r_{hi}, x_{hi}) \in \mathbb{Z}_p^4 \end{matrix} \;\middle|\; \begin{matrix} C_{lo} = r_{lo} \cdot H + x_{lo} \cdot G \wedge D_{lo} = r_{lo} \cdot P \wedge \\ C_{hi} = r_{hi} \cdot H + x_{hi} \cdot G \wedge D_{hi} = r_{hi} \cdot P \end{matrix} \right\}.$$

The formal specification of the protocol may be given as follows:

| Prover(x, w) | | Verifier(x) |
|---|---|---|
| | | $w \leftarrow_R \mathbb{Z}_p$ |
| | $\xleftarrow{w}$ | |
| $r \leftarrow r_{lo} + w \cdot r_{hi}$ | | |
| $x \leftarrow x_{hi} + w \cdot x_{hi}$ | | |
| $y_r \leftarrow_R \mathbb{Z}_p$ | | |
| $y_x \leftarrow_R \mathbb{Z}_p$ | | |
| $Y_0 \leftarrow y_r \cdot H + y_x \cdot G$ | | |
| $Y_1 \leftarrow y_r \cdot P$ | | |
| | $\xrightarrow{Y_0,\, Y_1}$ | |
| | | $c \leftarrow_R \mathbb{Z}_p$ |
| | $\xleftarrow{c}$ | |
| $z_r \leftarrow c \cdot r + y_r$ | | |
| $z_x \leftarrow c \cdot x + y_x$ | | |
| | $\xrightarrow{z_r,\, z_x}$ | |
| | | $C \leftarrow C_{lo} + w \cdot C_{hi}$ |
| | | $D \leftarrow D_{lo} + w \cdot D_{hi}$ |
| | | $z_r \cdot H + z_x \cdot G \stackrel{?}{=} c \cdot C + Y_0$ |
| | | $z_r \cdot P \stackrel{?}{=} c \cdot D + Y_1$ |

At the start of the protocol, the verifier $\mathcal{V}$ can send the prover $\mathcal{P}$ a challenge value $w\leftarrow_R \mathbb{Z}_p$. . The prover $\mathcal{P}$ can use the challenge value w to combine its witnesses $r\leftarrow r_{lo}+w\cdot r_{hi}$ and $c\leftarrow x_{lo}+w\cdot x_{hi}$. At this point of the protocol, the prover $\mathcal{P}$ and verifier $\mathcal{V}$ can proceed in a standard sigma protocol where the prover $\mathcal{P}$ samples random field elements $y_r$, $y_x$ and commits to them by sending $Y_0=y_r\cdot H+y_x\cdot G$, $Y_1=y_r\cdot P$ to the verifier $\mathcal{V}$. . Upon receiving another challenge c, it can provide the verifier $\mathcal{V}$ with the masked randomness and message $z_r=c\cdot r+y_r$ and $z_x=c\cdot x+y_x$. Finally, the verifier V can test the two relations $z_r\cdot H+z_x\cdot G=c\cdot C+Y_0$ and $z_r\cdot P=c\cdot D+Y_1$.

iv. Range Proof

The final argument system that may be implemented for the ZK-Token Program is a range proof for Pedersen commitments. Such an argument system can be defined with respect to the following language:

$$\mathcal{L}_{G,H,\ell,u}^{range} = \{x = C, w = (x, r) \mid C = x \cdot G + r \cdot H \wedge x \in [\ell, u]\}.$$

There are a number of ways to construct a zero-knowledge argument system for the language $$\mathcal{L}^{range}_{G,H,\ell,u}.$$

As one example, the ZK-Token Program may use the Bulletproofs system proposed by Boneh et al. in "Bulletproofs: Short proofs for confidential transactions and more." When compiled using a heuristic (e.g., a Fiat-Shamir heuristic), Bulletproofs may result in a non-interactive argument system where the proof size scales logarithmically in the bit-length of the range bounds $\ell$ and u. Furthermore, Bulletproofs can support proof aggregation, meaning that a prover $\mathcal{P}$ can generate a compact argument for multiple instances of the language $$\mathcal{L}^{range}_{G,H,\ell,u}$$

at once. To formally incorporate Bulletproofs into the protocol, the language $$\mathcal{L}^{range}_{G,H,\ell,u}$$

can be extended as follows:

$$\mathcal{L}^{range-agg}_{G,H,\{\ell\}_{i\in[N]},\{u\}_{i\in[N]},N} = \left\{x = \{C_i\}_{i\in[N]},\ w = \{(x_i, r_i)\}_{i\in[N]} \;\middle|\; \begin{array}{l} C_i = x_i \cdot G + r_i \cdot H \wedge \\ x_i \in [\ell_i, u_i] \forall\, i \in [N] \end{array}\right\}.$$

I. Managing ZK-Token Accounts

Users may be able to manage ZK-token accounts via a number of instructions. Among these, the (i) close account instruction, (ii) update account key instruction, and (iii) withdraw instruction may require zero-knowledge proofs that certify the validity of those instructions and state data.

Each ZK-token account may be uniquely associated with a single token account. These ZK-token accounts can be created or closed using create account instruction (or simply "create instruction") and close account instruction (or simply "close instruction"), respectively.

The create instruction can create a ZK-token account at the address derived as a Program Derived Address from the corresponding token account and its associated token mint. The encryption key of the ZK-token account may be set as the ElGamal public key that is specified as part of the instruction data. Moreover, the pending and available balance can be set to be default encryptions of zero.

The close instruction can be used to close a ZK-token account, transferring any fractional tokens to a destination account that is specified in the instruction. In some embodiments, the ZK-Token Program requires that a ZK-token account not hold any funds in order to be closed. Thus, the pending balance may need to be empty, as represented by a deterministic encryption of zero. Moreover, the available balance may need to be represented with an encryption of zero, and a proper zero-balance proof may need to be provided with the close instruction.

Figure 3:
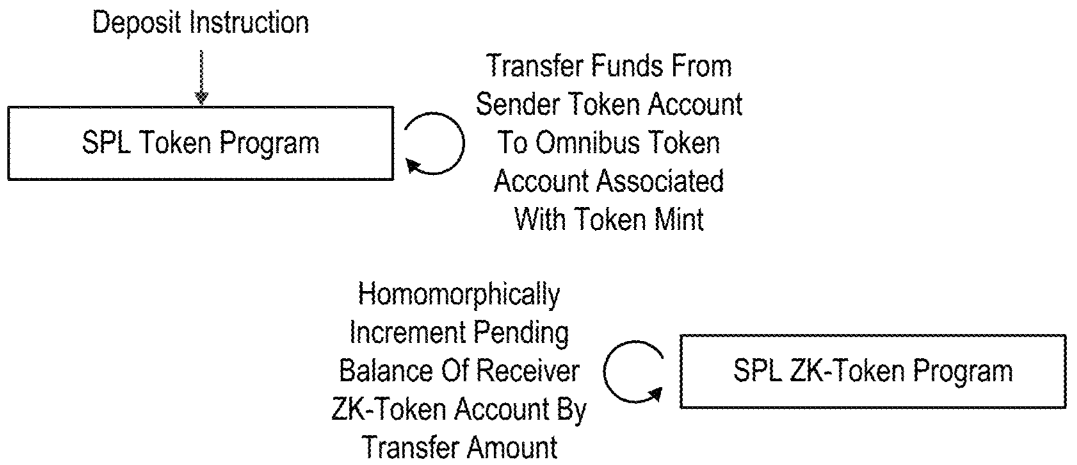
FIG. 3 includes a high-level diagrammatic illustration that shows how funds can be deposited into a ZK-token account.

Note that funds can be transferred between regular token accounts and the corresponding ZK-token accounts, for example, via deposit and withdraw instructions. The deposit instruction could be used to transfer funds from a token account to its corresponding ZK-token account. On the token side, funds can be transferred from the source token account to an omnibus token account associated with the token mint. On the ZK-Token side, the pending balance can be homomorphically incremented by the deposit amount. FIG. 3 includes a high-level diagrammatic illustration that shows how funds can be deposited into a ZK-token account.

Figure 4:
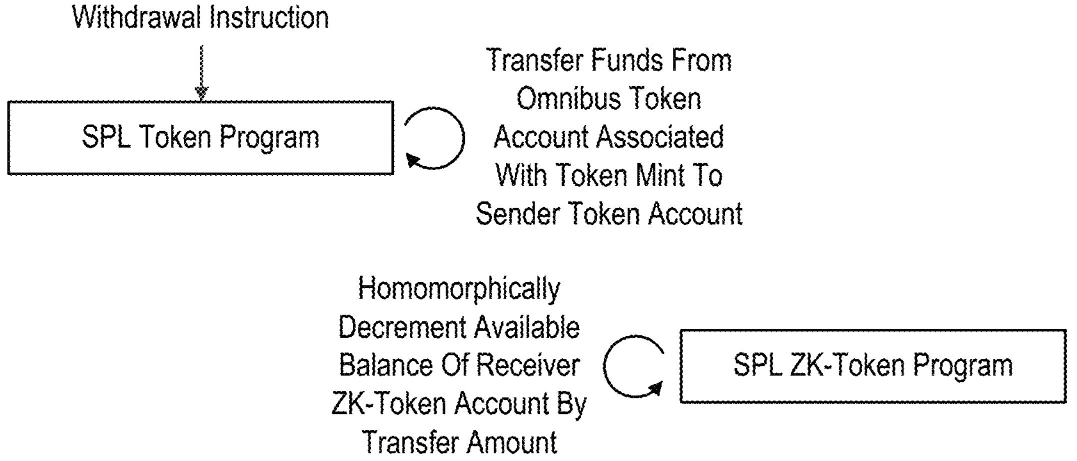
FIG. 4 includes a high-level diagrammatic illustration that shows how funds can be withdrawn from a ZK-token account.

Conversely, the withdrawal instruction could be used to transfer funds from a ZK-token account to its corresponding token account. At a high level, the withdrawal instruction can work in reverse compared to the deposit instruction. FIG. 4 includes a high-level diagrammatic illustration that shows how funds can be withdrawn from a ZK-token account. Funds can be transferred from the omnibus token account to the appropriate token account, and the encrypted available balance for the corresponding ZK-token account can be decremented by the withdraw amount. As funds are removed from the ZK-Token account, a transaction may include a proper range proof that certifies that there are enough funds in the ZK-token account.

As discussed above, instructions that require zero-knowledge proofs may be susceptible to front-running attacks. As zero-knowledge proofs are verified with respect to an account state, these proofs can be invalidated if the account state changes before these proofs are actually processed. The funds in ZK-token accounts can be divided into pending balance and available balance such that the withdrawn and transfer instructions—instructions that are likely to be used frequently—are not susceptible to these types of attacks. Funds that are sent to a ZK-token account may always be aggregated into its pending balance, and funds that are sent from a ZK-token account may always be subtracted from its available balance. The pending balance of a ZK-token account can be added to its available balance via an apply instruction. When executed, the apply instruction can aggregate the pending balance of a ZK-token account into its available balance. After the instruction is executed, the available balance becomes the sum of its pending and available balances. The pending balance may also be set to be empty (i.e., with a deterministic encryption of zero).

In contrast to the withdraw and transfer instructions, the close and update key instructions may still potentially be susceptible to front-running attacks. While front-running attacks are likely to be difficult, if not impossible, to actually carry out, the ZK-Token Program may provide instructions to defend against potential attaches. A disable inbound transfers instruction can be used to disable a ZK-token account from accepting incoming transfers. Conversely, an enable inbound transfers instruction can be used to enable a ZK-token account to accept incoming transfers. If any close instructions or update key instructions begin failing, the inbound transfers may be disabled using the disable inbound transfers instructions before further instructions are submitted. The enable inbound transfers instruction can then be used to permit inbound transfers once again after the threat of a potential attack has passed.

J. Confidential Transfers

One of the more cryptographically advanced components of the ZK-Token Program is the transfer instruction. The high-level intuition behind how transfers are done in the ZK-Token Program is provided above. This section includes further implementation details regarding the transfer instruction.

As discussed above, a transfer amount $0 \le x \le 2^{64}$ can be encrypted as two 32-bit numbers $x_{lo}$, $x_{hi}$ such that $x = x_{lo} +$ $2^{32} \cdot x_{hi}$. These two numbers may be encrypted under the three public keys that are associated with the source, destination, and auditor accounts for the transfer. Recall that a ciphertext (e.g., an ElGamal ciphertext) can include two components, namely, (i) a Pedersen commitment that depends on the message to be encrypted but is independent of the public key and (ii) a decryption handle that depends on the public key but is independent of the message to be encrypted. As the Pedersen commitment is independent of public keys, it can be shared among encryption of a single message under multiple public keys. Therefore, an ElGamal ciphertext that encrypts a transfer amount can include the following components:

Message Commitments:

$comm_{x_{lo}} = PedComm(x_{lo})$ $comm_{x_{hi}} = PedComm(x_{hi})$

Decryption Handles for $x_{lo}$:

$dh_{source,lo} = DecHandle_{lo}(pk_{source})$ $dh_{dest,lo} = DecHandle_{lo}(pk_{dest})$ $dh_{auditor,lo} = DecHandle_{lo}(pk_{auditor})$ Decryption Handles for $x_{hi}$:

$dh_{source,hi} = DecHandle_{hi}(pk_{source})$ $dh_{dest,hi} = DecHandle_{hi}(pk_{dest})$ $dh_{auditor,hi} = DecHandle_{hi}(pk_{auditor})$ A transfer instruction may need to include zero-knowledge proofs that have two parts. The first part may be a range proof that certifies that the following Pedersen commitments are for messages of the correct range:

- The commitment $comm_{final} = comm_{available} - (comm_{x_{lo}} + 2^{32} \cdot comm_{x_{hi}})$ is a commitment of 64-bit numbers where $comm_{available}$ is the Pedersen commitment associated with the source encrypted spendable balance.
- The commitment $comm_{x_{lo}}$ is a commitment of a 32-bit number.
- The commitment $comm_{x_{hi}}$ is a commitment of a 32-bit number.

Instead of having three independent range proofs for the three commitments, one can generate a single aggregate range proof that certifies validity of the three commitments as discussed above. The second part may be a ciphertext validity proof that certifies that the decryption handles are generated correctly for the public keys $pk_{source}$, $pk_{dest}$, and $pk_{auditor}$.

A single transfer instruction may need to include the encrypted transfer amount and the zero-knowledge proofs certifying the validity of the ciphertexts. Ideally, the ciphertexts and zero-knowledge proofs should be included into a single transfer instructions. However, limitations on the size of instructions may prevent this. In scenarios where the ciphertexts and zero-knowledge proofs cannot fit into a single transfer instruction, the transfer instruction may be split into two separate instructions, each containing independent ciphertext and zero-knowledge proof components of a transfer.

K. Overview of Blockchain Technology and Underlying Architecture

The Token Program and ZK-Token Program may be able to communicate with a blockchain technology through respective APIs for access control purposes. Accordingly, the blockchain technology for the Token Program may store hashes that are representative of non-confidential transactions in one or more blockchains, and the blockchain technology for the ZK-Token Program may store hashes that are representative of confidential transactions. At a high level, a blockchain is a growing list of records (also referred to as "blocks") that are linked together using cryptography. Each block contains a cryptographic hash of the previous block, a timestamp, and transaction data (e.g., information regarding the sender token account, receiver token account, and transfer amount, or ciphertexts encrypted under public keys of sender and receiver ZK-token accounts, range proof, and equality proof). The timestamp proves that the transaction data existed when the block was published in order to get into its hash. Blocks contain the hash of the previous block, forming a chain, with each additional block reinforcing the ones before it. Therefore, blocks are resistant to modification of their data because once recorded, the data in any given block cannot be altered retroactively without altering all subsequent blocks.

Figure 5:
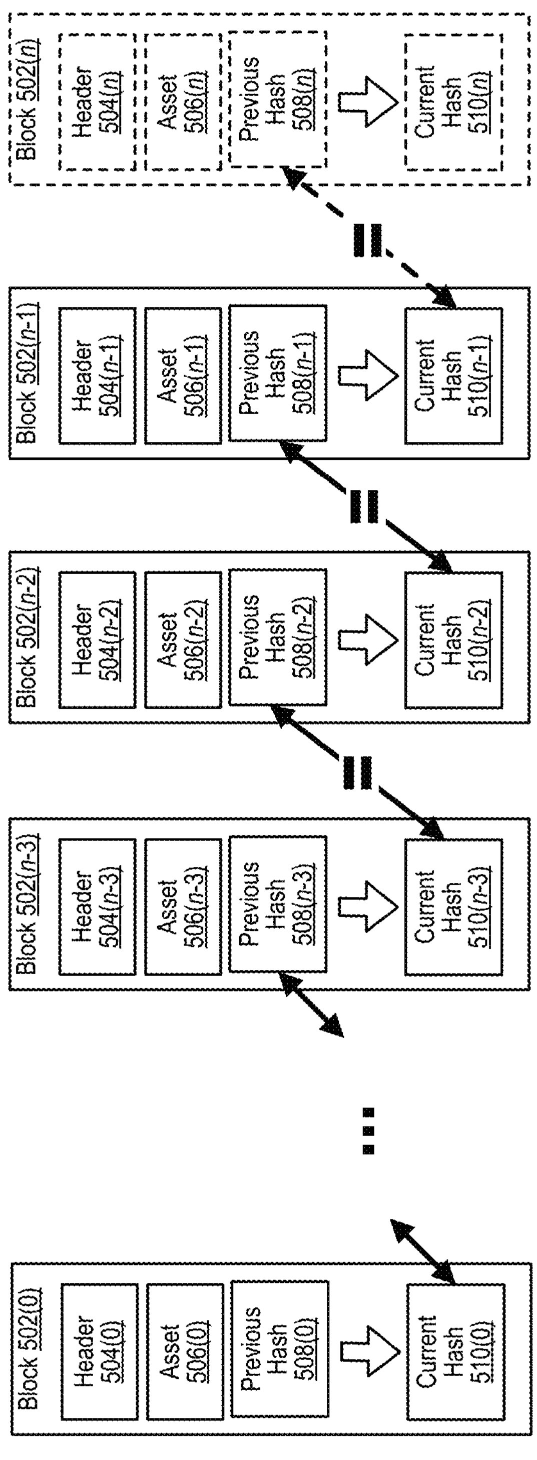
FIG. 5 shows a series of n blocks that are cryptographically linked to form a blockchain, as may be used to record non-confidential transactions initialized via the Token Program or confidential transactions initialized via the ZK-Token Program.

FIG. 5 shows a series of n blocks 502 that are cryptographically linked to form a blockchain 500, as may be used to record non-confidential transactions initialized via the Token Program or confidential transactions initialized via the ZK-Token Program. Each block 502 stores header information 504, an asset 506, a previous hash value 508, and a current hash value 510. When cryptographically linked, the blocks 502 form an ordered sequence in which each block is uniquely indexed. For clarity, each block 502 is labeled with an index in parentheses that identities the position of that block 502 in the blockchain 500. For example, the $i^{th}$ block is labeled block 502(*i*), and it stores similarly indexed header information 504(*i*), asset 506(*i*), previous hash value 508(*i*), and current hash value 510(*i*). As shown in FIG. 5, the blockchain 500 begins with an origin block 502(0). The number of blocks in the blockchain 500 may be hundreds, thousands, millions, or more. As noted above, separate blockchains may be maintained by the Token Program and ZK-Token Program. These blockchains generally do not include the same number of blocks, as the number of confidential transactions may be largely, if not entirely, independent of the number of non-confidential transactions. In FIG. 5, only the origin block 502(0) and the four most recent blocks 502(*n*−3), 502(*n*−2), 502(*n*−1), and 502(*n*) are shown for the purpose of illustration.

Identical copies of the blockchain 500 may be stored on multiple nodes that cooperate as a peer-to-peer distributed computing network to implement the blockchain 500 as a type of distributed ledger. In this case, the nodes cooperate to add new blocks to the blockchain 500 in a decentralized manner. Said another way, the nodes may cooperate to add new blocks to the blockchain 500 without a central authority or trusted third party.

A consensus protocol may be implemented by the nodes to validate data to be appended to the blockchain 500. After data is validated by a node, the node may broadcast the validated data to all other nodes, which then update their local copies of the blockchain 500 by appending the validated data to the blockchain 500 as a new block. Validation may be implemented via proof of work (POW), proof of stake (POS), proof of authority (POA), or another type of consensus protocol. After a block 502 is added to the blockchain 500, it can only be modified via collusion of a majority of the nodes (i.e., a >50 percent attack). Such collusion is highly unlikely, so blockchains are considered tamper-resistant and secure by design.

Fundamentally, the blockchain 500 may be similar in some respects to those implemented for cryptocurrencies, such as Bitcoin and Ethereum, that process and then store data related to exchanges between parties for payment purposes. However, the blockchain 500 (and, more specifically, the asset 506 in each block 502) may store information related to either non-confidential transactions or confidential transactions. By recording information related to non-confidential and confidential transactions to separate blockchains, separation can be maintained between the Token Program and ZK-Token Program. Advantageously, data that is stored in the blockchain 500 may essentially be immutable, and thus can be readily verified (e.g., as part of an audit).

While not shown in FIG. 5, the blockchain 500 may have a unique name or identifier that allows it to be uniquely identified from amongst other blockchains that are stored, implemented, or managed by the same computational architecture. Thus, the blockchain 500 may not be the only one accessible to the computational architecture. As an example, the computational architecture may manage multiple blockchains, one of which is responsible for storing data related to non-confidential transactions effected by the Token Program and another of which is responsible for storing data related to confidential transactions effected by the ZK-Token Program.

FIG. 5 also illustrates how when a new block 502($n$) is added to the blockchain 500, it can be cryptographically linked to the previous block 502($n$−1). The current hash value 510($n$−1) of the previous block 502($n$−1) can be copied and then stored as the previous hash value 508($n$) of the new block 502($n$). Thus, the current hash value 510($n$−1) of the previous block 502($n$−1) may equal the previous hash value 508($n$) of the new block 502($n$). The current hash value 510($n$) can then be determined by hashing the header information 504($n$), asset 506($n$), and previous hash value 508($n$) stored in the new block 502($n$). For example, any combination of the header information 504($n$), and asset 506($n$), previous hash value 508($n$) may be concatenated into a single string that is input into a cryptographic hash function (or simply "hash function") whose output is stored as the current hash value 510($n$). Other ways of using the hash function to generate the current hash value 510($n$) may be employed without departing from the principles of the present disclosure. Each hash value may be representative of a cryptographically calculated value of fixed length. While the hash values are not guaranteed to be unique across all data, it is usually very hard to duplicate so hash values are valuable in identifying blocks within the blockchain 500.

The current hash values 510 provide an efficient way to identify changes to any data stored in any block 502, thereby ensuring both the integrity of the data stored in the blockchain 500 and the order of the blocks 502 in the blockchain 500. To appreciate how the current hash values 510 enforce data integrity and block order, consider a change made to one or more of the header information 504($i$), asset 506($i$), and previous hash value 508($i$) of the block 502($i$), where i is any integer between 1 and n. The change may be detected by rehashing the block 502($i$) and comparing the result with the current hash value 510($i$) stored in the block 502($i$). Additionally or alternatively, the rehash value may be compared to the previous hash value 508($i$+1) that is stored in the subsequent block 502($i$+1). Due to the change, the rehash value will not equal the current hash value 510($i$) and the previous hash value 508($i$+1). These unequal hash values can be used to identify an attempt to alter the block 502($i$). Assuming no entity controls a majority of the voting power (i.e., there is no collusion), such attempts to modify data in the blockchain 500 will be rejected in accordance with the consensus protocols mentioned above.

The blockchain 500 may be verified via two steps. First, for each block 502($i$), a rehash of the header information 504($i$), asset 506($i$), and previous hash value 508($i$) may be compared to the current hash value 510($i$) to ensure that the rehash value equals the current hash value 510($i$). This first step authenticates the data stored within each block 502. Second, for each block 502($i$), the previous hash value 508($i$) may be compared to the current hash value 510($i$−1) of the previous block 502($i$−1) to ensure that these values are equal. This second step authenticates the order of the blocks 502. Verification of the blockchain 500 may proceed "backwards." Said another way, the blockchain 500 can be verified by sequentially verifying each block 502 starting from the most recent block 502($n$) and ending at a preceding block (e.g., the origin block 502(0)). Alternatively, verification may proceed "forwards" by sequentially verifying each block 502 starting from the origin block 502(0) and ending with a subsequent block (e.g., the most recent block 502($n$)). Validation may occur periodically (e.g., once per hour, day, or week), in response to a predetermined number of new blocks being added to the blockchain 500, or in accordance with a different schedule or triggering event. For the origin block 502(0), the previous hash value 508(0) may be set to an arbitrarily chosen value.

In FIG. 5, each block 502($i$) is shown storing its current hash value 510($i$). However, it is not necessary for each block 502($i$) to store its current hash value 510($i$) since it can always be generated by hashing the other data stored in the block 502($i$). Nevertheless, storing the current hash value 510($i$) in each block 502($i$) can greatly speed up retrieval of the blocks 502, and thus access to the asset 506, by using the current hash values 510 as search keys in a database index. Each node may also store the corresponding index i. When a new block 502($n$) is added to the blockchain 500, its owner may be given the resulting current hash value 510($n$) as a confirmation that a transaction—either confidential or non-confidential—has been committed to the blockchain 500.

Processing System

Figure 6:
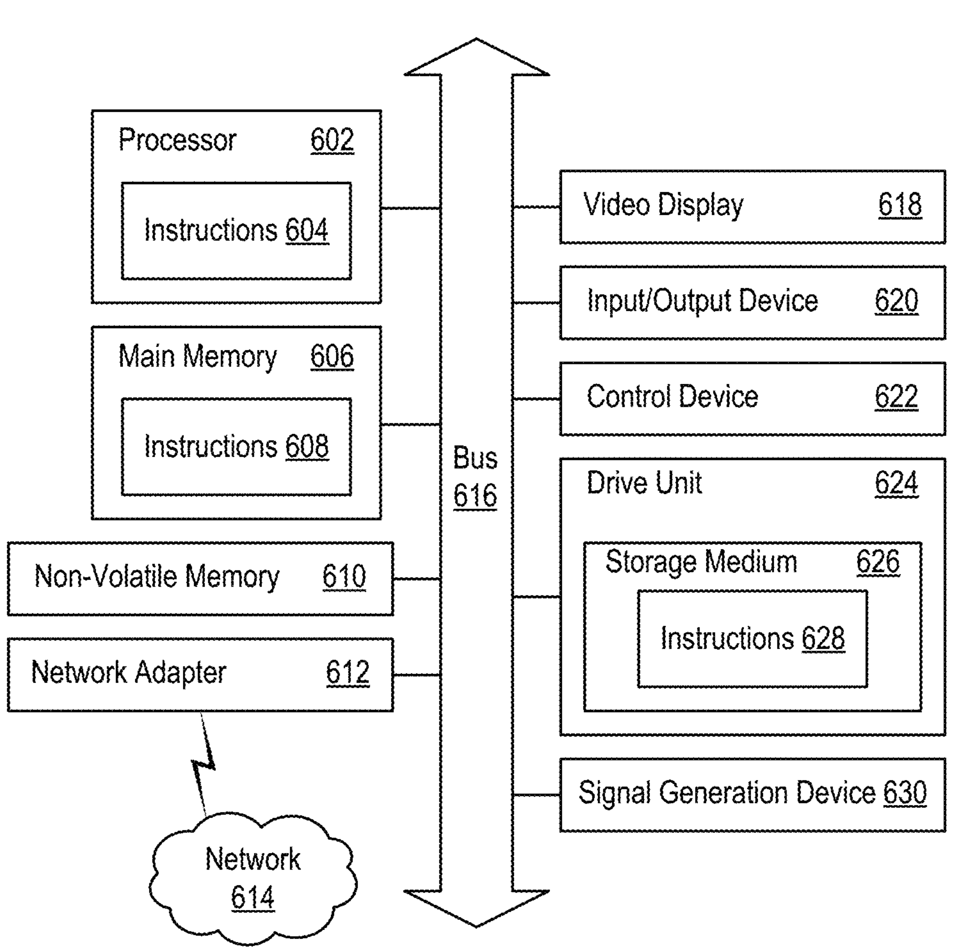
FIG. 6 includes a block diagram illustrating an example of a processing system in which at least some operations described herein can be implemented.

FIG. 6 includes a block diagram illustrating an example of a processing system 600 in which at least some operations described herein can be implemented. For example, components of the processing system 600 may be hosted on a computing device through which an individual is able to interact with the Token Program or ZK-Token Program (e.g., through interfaces presented via a computer program, such as a mobile application, desktop application, or web browser). As another example, components of the processing system 600 may be hosted on a computing device on which aspects of the Token Program or ZK-Token Program are implemented.

The processing system 600 may include any combination of a processor 602, main memory 606, non-volatile memory 610, network adapter 612, video display 618, input/output devices 620, control device 622 (e.g., a keyboard or pointing device), drive unit 624 including a storage medium 626, and signal generation device 630 that are communicatively connected to a bus 616. The bus 616 is illustrated as an abstraction that represents one or more physical buses or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 606, non-volatile memory 610, and storage medium 626 are shown to be a single medium, the terms "machine-readable medium" and "storage medium" should be taken to include a single medium or multiple media (e.g., a centralized/distributed database and/or associated caches and servers) that store one or more sets of instructions 628. The terms "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in a computing device. When read and executed by the processor 602, the instruction(s) cause the processing system 600 to perform operations to execute elements involving the various aspects of the present disclosure.

Further examples of machine- and computer-readable media include recordable-type media, such as volatile memory and non-volatile memory 610, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 612 enables the processing system 600 to mediate data in a network 614 with an entity that is external to the processing system 600 through any communication protocol supported by the processing system 600 and the external entity. The network adapter 612 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A non-transitory medium with instructions stored thereon that, when executed by a processor, cause the processor to perform operations comprising:

receiving input that is indicative of an instruction from an owner to initialize a first account for a first program that permits confidential transfers of tokens;

establishing, based on the input, that the owner is associated with a second account for a second program that permits non-confidential transfers of tokens; and deriving, in response to said establishing, an account address for the first account based on (i) an account address of the second account and (ii) a mint address of the second account.

2. The non-transitory medium of claim 1, wherein the operations further comprise:

initializing the first account by populating a data structure with (i) the derived account address, (ii) a mint address of a corresponding mint, and (iii) an owner address for the owner.

3. The non-transitory medium of claim 2, wherein the data structure is further populated with (iv) a balance that is encrypted using a public cryptographic key associated with the owner.

4. The non-transitory medium of claim 3, wherein the balance is encrypted using an encryption scheme that is linearly homomorphic.

5. The non-transitory medium of claim 2, wherein the data structure is further populated with (iv) a balance that is encrypted using a public cryptographic key that is specific to the first account and that is included in the instruction.

6. The non-transitory medium of claim 2, wherein the owner is able to participate in the confidential transfer of tokens to and from the first account in response to the first account being initialized.

7. The non-transitory medium of claim 2, wherein the operations further comprise:

receiving second input that is indicative of a request to initiate a confidential transfer from the first account to a third account for the first program that is associated with a recipient;

subtracting a first ciphertext included in the second input from an encrypted balance of the first account; and adding a second ciphertext included in the second input to an encrypted balance of the third account that is associated with the recipient.

8. The non-transitory medium of claim 7, wherein the second input includes (i) the first ciphertext that is encrypted under a public cryptographic key associated with the owner, (ii) the second ciphertext that is encrypted under a public cryptographic key associated with the recipient, (iii) a range proof, and (iv) an equality proof.

9. A non-transitory medium with instructions stored thereon that, when executed by a processor, cause the processor to perform operations comprising:

receiving input that is indicative of a request to initiate a confidential transfer from a first account associated with a sender to a second account associated with a recipient, wherein the input includes (i) a first ciphertext encrypted under a public cryptographic key of the sender, (ii) a second ciphertext encrypted under a public cryptographic key of the recipient, and (iii) at least one zero-knowledge proof;

removing the first ciphertext from an encrypted balance of the first account; and appending the second ciphertext to an encrypted balance of the second account.

10. The non-transitory medium of claim 9, wherein the at least one zero-knowledge proof includes a range proof that certifies that the first ciphertext and/or the second ciphertext encrypts a value within a given range.

11. The non-transitory medium of claim 9, wherein the at least one zero-knowledge proof includes an equality proof that certifies that the first and second ciphertexts encrypt a same value.

12. The non-transitory medium of claim 9, wherein the operations further comprise:

storing a hash that is representative of the confidential transfer on a blockchain that is associated with a program that permits confidential transfers.

13. The non-transitory medium of claim 12, wherein the first account is associated with another account for a second program that permits non-confidential transfers.

14. The non-transitory medium of claim 13, wherein the second program is associated with a second blockchain on which hashes representative of the non-confidential transfers are stored.

15. The non-transitory medium of claim 9, wherein the operations further comprise:

identifying a first data structure that is representative of the first account and that includes (i) a first account address, (ii) a first mint address, (iii) a first owner address, and (iv) the encrypted balance of the first account; and identifying a second data structure that is representative of the second account and that includes (i) a second account address, (ii) a second mint address, (iii) a second owner address, and (iv) the encrypted balance of the second account.

16. The non-transitory medium of claim 9, wherein the encrypted balance of the first account is representative of an encrypted available balance of the first account from which outgoing funds are subtracted, and wherein the encrypted balance of the second account is representative of an encrypted pending balance of the second account to which incoming funds are added.

17. The non-transitory medium of claim 16, wherein the operations further comprise:

executing an instruction to transfer the encrypted balance of the encrypted pending balance to an encrypted available balance of the second account from which the outgoing funds would be subtracted.

18. A method for initiating a confidential transfer from a first account that is associated with a sender to a second account that is associated with a recipient, the method comprising:

receiving input that includes (i) a first ciphertext that is encrypted using a public cryptographic key of the sender and (ii) a second ciphertext that is encrypted using a public cryptographic key of the recipient;

merging the first and second ciphertexts to create a merged ciphertext; and effecting the confidential transfer by— removing the merged ciphertext from an encrypted balance of the first account, and appending the merged ciphertext to an encrypted balance of the second account.

19. The method of claim 18, wherein the input further includes (iii) a zero-knowledge proof that certifies a relationship between a first amount represented by the first ciphertext and a second amount represented by the second ciphertext.

20. The method of claim 18, wherein said merging is performed in a homomorphic manner.

* * * * *